Nov. 2, 1943.  W. LEATHERS  2,333,321
TELE-METER READING DEVICE
Filed Oct. 19, 1939
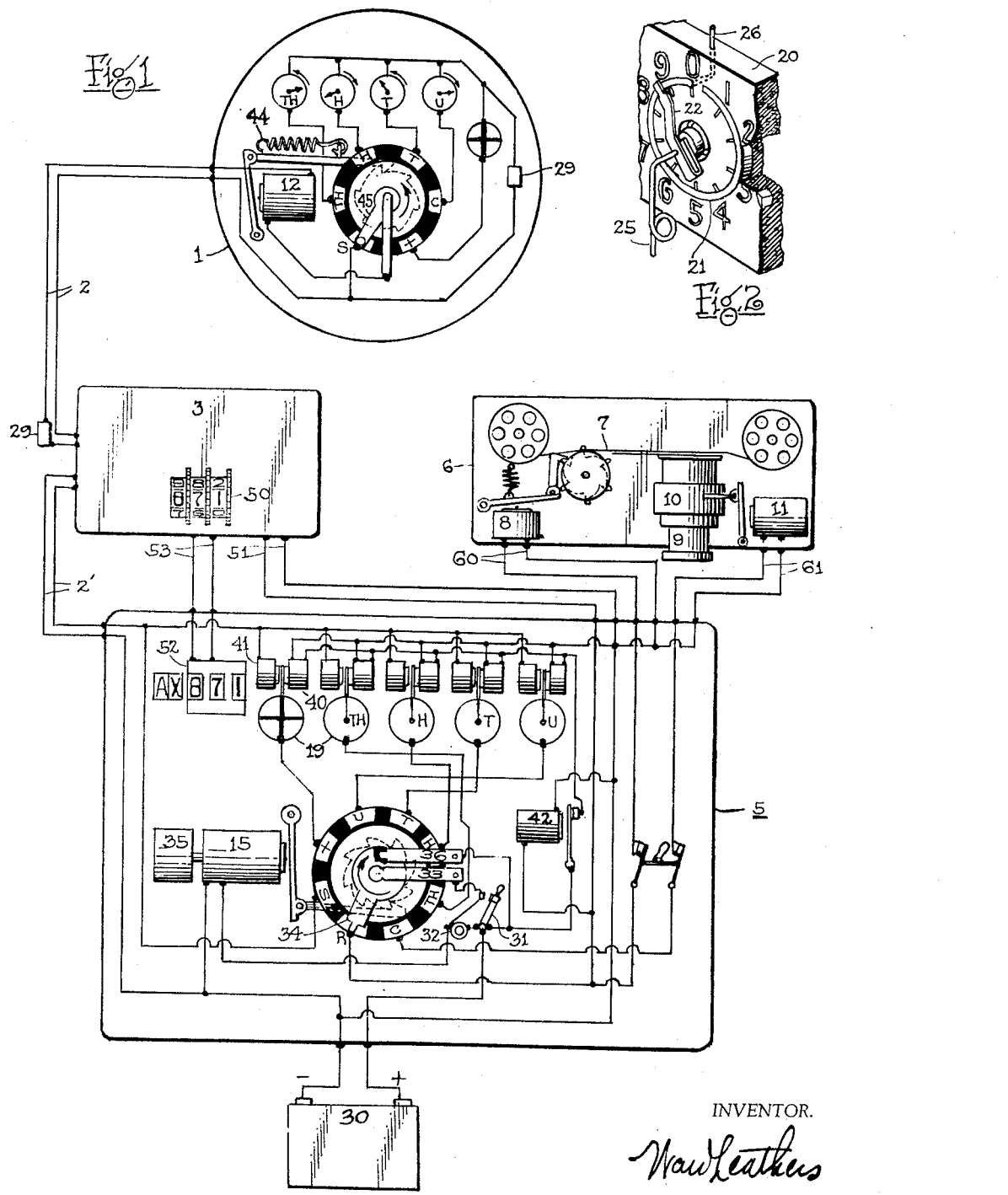
INVENTOR.
Wau Leathers Patented Nov. 2, 1943

2,333,321

UNITED STATES PATENT OFFICE 2,333,321

TELEMETER-READING DEVICE

Ward Leathers, Brooklyn, N. Y., assignor, by mesne assignments, to International Business Machines Corporation Application October 19, 1939, Serial No. 300,157

2 Claims. (Cl. 177—351)

My invention relates to telemetric systems and more particularly to systems in which the readings of a plurality of meters may be successively indicated at a remote point or central station.

An object of my invention is to provide means whereby electric, gas, water, steam or other widely scattered service meters may be read from a central station, and have such reading accomplished by means of an electric circuit or circuits over a wire or wires joined between the meters and the central station.

A further object of the invention is to provide an apparatus by means of which a photographic record of the indication or reading of such meters over a skeletonized wire system may be made whereby a large number of meters may be accommodated despite the relatively few wires employed. According to the present invention, as many as ten meters may be read over a single wire circuit; one thousand meters may be read over a two-wire circuit; and ten thousand may be read over a three-wire circuit.

Another object of my invention is to provide a system of this character which may be employed by a public utility corporation for transmitting an indication of a customer's meter by the temporary use of the customer's telephone lines and the automatic circuits and equipment associated therewith.

Yet another object of the invention, in a modified form thereof, is to provide a compact portable apparatus which may be carried by an inspector and quickly associated with any meter at a location outside of the building where the meter is installed and which will operate to render a photographic record or indication of the meter reading, as well as of any other data which it is desired to obtain, such as the meter number and the like associated with the meter.

Further objects and advantages of the invention will appear as the following description progresses.

In the accompanying sheet of drawings

Fig. 1 is a diagrammatic view of an apparatus constructed in accordance with the principles of the present invention and showing a meter, a line-selector, and a meter reading board.

Fig. 2 is a fragmentary, enlarged, perspective view of a dial mechanism applicable to existing electric meters.

Where a wire-circuit is provided from a central station to each meter, as shown in Fig. 1, a meter 1, like all other meters in the system is electrically joined by a pair of wires 2 (or a single wire and ground) to a manual or automatic telephone-type selector 3. The selector is joined to a meter-reading-board, generally characterized by the numeral 5, by as many pairs of wires (each representing an electric circuit) as required or desired for performing the interrelated functions hereinafter described. I prefer to use, for ease of understanding, three pairs of wires as shown. Mounted above the meter-reading-board 5 is a photo-film (preferably 16-mm.) recording-mechanism 6 for rapidly recording all the data on the board, i. e. all herein shown on the board and any other that it may be desirable to have appear thereon for accounting, identification, or other purposes, such as a card carrying name, address, meter-number, former meter-reading, etc. at the time that particular meter is being "read." The recording mechanism 6 comprises reels and film 7 driven from "frame" to "frame" by an electromagnet 8, and lens 9 with shutter 10 operated by electromagnet 11.

Returning to the meter 1, a step-by-step relay 12 with any desired number of contacts on its phase-wheel may be mounted within the case of the present-day electric meter. The diagrammatic meter 1 shows the usual four dials, marked U for units, T for tens, H for hundreds, TH for thousands. These are each provided with a variable "dial-rheostat" the resistance of which is varied by the indicator-finger driven by the meter's measuring mechanism, and "read" at the "meter-reading-board" 5 by measuring on a sensitive voltmeter 19 (or ammeter) the resistance to an accurately maintained potential, such as from a fully-charged battery. Each "dial-rheostat" is measured and indicated on the "reading-board" when placed in series with its corresponding measuring instrument by a pair of phasing step-by-step relays one, 12, in the meter, the other, 15, on the "reading-boards."

The variable resistance herein called a "dial-rheostat" is best illustrated in Figure 2 wherein a panel 20, moulded of a high-dielectric plastic such as phenolresin, has moulded therein for each dial an incomplete circular groove 21 for receiving the resistance element and a concentric hole through which protrudes the meter-driven element. The groove 21 is filled, as by moulding, with another plastic of greater conductivity such as a thermo-plastic into which has been evenly mixed before moulding a finely pulverized conducting element. Or the groove 21 may be filled with a fine coil of resistance wire, the same being die-formed to substantial squareness for tight fitment in the groove. Or other desirable resistance material may be used. An important process of manufacture comprising surface-grinding after filling—for the surface over which the indicating finger 22 moves, however lightly the finger contacts, must be smooth and highly non-corrosive to maintain accurate registration. The panel 20 is applicable to present meters by removing the present indicating fingers, attaching the panel over the present panel and replacing fingers by spring-bronze (or other suitable metal) fingers 22 having hubs insulated from their spindles, and being electrically joined to their corresponding contacts on the step-by-step relay 12 by conductors 25. An electric "common" 26 completes the circuit.

In the meter 1, I have provided a panel with four "dial-rheostats"—one each for units, tens, hundreds and thousands, and a fifth resistance herein called a "monitor-resistance" (the latter, as well as the corresponding contact-faces on phase wheels and indicator instruments is marked in the drawing with a cross). This "monitor-resistance" has a fixed resistance value slightly greater than that of the full circle 21. Since the finger decreases the resistance from minus one to nine plus in its rotation, and since the "monitor-resistance" is slightly greater than the maximum dial resistance, should the relay 12 and 15 be out of step or phase, the monitor signal would fall on the then corresponding indicator on the reading board and there show "blank"—thus an error in phasing would be evident on the photo-record. The object of the "monitor-resistance" is further to show in which direction lies (i. e. above or below norm) and the magnitude of "error" on the indicator instruments 19. The circuit 2 is pre-balanced by means of set resistances 29 so that when the needle of the "monitor" indicator 19 is exactly on its center mark the needles on the other four instruments should indicate accurately. Slight error on the "monitor" instrument may be used as a correction for all other indicating instruments. A segment marked S on relays 12 and 15 is so labelled as it is the starting phase on the meter relay 12. Since this starting circuit has less reistance than any of the other five, should the relay 12 be out of phase, this circuit will also show "blank" on its then corresponding instrument 19. Thus all phase errors are evident. With a measuring instrument of greater range than those on the "board" 5 shunted into the circuit 2, a trouble-man with a battery and a manual switch, and by means and methods common to signal practice, can immediately correct an error in phase in any meter in the "system" direct from central station.

Current may be supplied this "meter-reading" mechanism from any constant-potential source (such as battery 30 using voltages in keeping with modern telephone practice—preferably 24 volts). Positive current is supplied through a switch 31 or a starter-push-button 32 to a spring contact 33 feeding a rotating contact 34 for distribution when and as driven by the electromagnet 15 in the direction of the arrow. The advancing action of this step-by-step relay is timed by a "controller" 35 so long as current is supplied from the source through the same switch 31 or button 32.

The "timer" 35 controls the speed of function of the entire organization. By means of an auxiliary contact finger 36 once the cycle is started by the push-button 32 (switch 31 open) the rotating contact 34 will return to and stop at segment R. When the switch 31 is closed, the cycle repeats and continues to repeat.

In order that a measuring and indicating instrument 19 may register the resistance of a "dial-rheostat" in decimal terms corresponding to the ten digits of the dial, it is desirable to have the needle pass over a "scale" numbered from 0 to 10—the figures corresponding to those of the dial in Figure 2. Resistance or resistances 29 are so set that when the needle on the "monitor" 19 is at center position needles in the other four instruments U (units) T (tens) H (hundreds) TH (thousands) should register exactly 1 or 9 when the corresponding spring finger 22 so indicates. Since the five indicating instruments 19 are set each at a different time, and in order that the indicating needles may hold their position until all can be photo-recorded at one time, and further, in order that they may all return to the zero or normal position when the cycle of "reading" one meter is completed that they be ready immediately for the automatic "reading" of the next meter, I have provided means whereby an electrically controlled "brake" 40 constantly supplied with current from the battery 30 is caused to "relax" by an electric relay 41 (such as a telephone relay) for that interval in the "cycle" when the associated indicating instrument is recording its corresponding dial on the meter then being "read." And I have provided a telephone-type relay 42 for breaking the constant current supply of all the "brakes" when the cycle is completed—thus they all return at the same time to normal disuse (with the indicating needles not visible).

It should be noted that all the mechanism above described is controlled by the "timer" 35, and that when the coil 15 moves the rotating arm 34 in the direction of the arrow from, say, segment S to segment —, it passes over an intermediate insulator or current-break (shown black on the drawing) that breaks the current, causing the coil 12 in the meter to "relax," and thus permitting the spring 44 also to advance the rotating distributing contact 45 from S to +.

Selector 3 may be a well known and simple automatic telephone selector, preferably of the "bar" type. The unit may preferably have 999 lines joined to 999 meters. Selection may be made manually by "plugging" or may be "dialed" as at 50, or the "connections" may be advanced successively automatically from 001 to 999 by well-known step-by-step mechanism actuated from the "board" 5 through the "set-up" circuit 51. By means common to telephony whereby when a "dialed" circuit is joined to a manually established circuit the number dialed is made to graphically appear to the operator, the number of the circuit "selected" either manually or automatically by the selector 3 can be made to appear on the "board" 5 as at 52 actuated by the circuit 53, for "photo-record" purposes. The prefix AX may be a manually set index to identify the selector unit on the photo-record. (The "board" 5 being static, as shown, the last meter "read" was No. AX871.)

The operation of my "tele-reader" system as just described is as follows:

Distributor contact stands on segment R (meaning reset). Positive current from the battery 30 is available at the switch 31, the button 32 and the now dead-ended spring contact 36. Current flows through the "brakes" 40. Press the button 32. Current is supplied by way of 33 and 34 and the segment R to the set-up circuit 51. The "selector" 3 establishes a circuit with meter No. AX872 (which number is set up at 52).

The film 7 is advanced one "frame" by means of a circuit 60 and the electromagnet 8. The coil (delayed by 35) actuates. The distributor contact moves to segment S (start). The starter current reaches the magnet 12 in the meter by way of wires 2 and 2'. Magnet 12 actuates, storing energy in spring 44. Timer 35 by means of coil 15 now advances 34 to segment +; "monitor" instrument 19 is now ready to check on the constancy of the sum of all the resistance in the entire operating circuit. Meanwhile as 34 passed from S to + the current-break relaxed 12 and the spring 44 advanced the distributor contact 45 to +. A fixed resistance + in the meter then sets the needle of "monitor" 19 exactly on center—the circuit from segment + on the "board" 5 to segment + in the meter passed through the "brake" release 41 freeing the needle momentarily. 35 and 15 repeat, advancing 34 to segment U—12 and 44 repeat, advancing 45 to U. "Dial-rheostat" U is now measured and indicated at instrument U on the "board." All four dials are "read" as 34 and 45 advance through segments T, H, and TH. The next actuation of 35 takes 45 to S where it stops: 34 goes to segment C (camera); the shutter 10 is operated by coil 11 through circuit 61. 35 then carries 34 to segment R from which the cycle may be repeated for "reading" and recording the reading of the next meter. Obviously with the switch 31 closed the mechanism just described would proceed automatically to the "reading" and recording of 999 meters. The circuit 51 can by suitable manual switch mechanism, especially such as is common to a manual telephone board, be joined to as many selector units (similar to 3) as may be desired.

The above described apparatus is applicable in instances where the main telemetric channels, such as the channels 2, leading from the central station to the meters, are installed primarily for the purpose of meter-reading. Systems of this character may have auxiliary uses, as for example, in the high frequency one-way transmission of so-called "wired radio," television or picture transmission of "radio newspapers," without interfering with the primary meter-reading function.

The invention is not to be limited to the exact arrangement of parts shown in the accompanying drawing or described in this specification as various changes in the details thereof may be resorted to without departing from the spirit of the invention.

What I claim is:

1. In an apparatus for indicating at a remote point the relative positions of a series of movable members, a variable resistance for each movable member, a fixed monitor resistance, a reading circuit including a resistance indicator for each movable member having a definite resistance-reading range commensurate with the resistance value of its respective movable member and a separate resistance indicator for the fixed monitor resistance having a reading range commensurate with the value of the fixed monitor resistance, said fixed monitor resistance having a resistance value lying outside of the operating range of the variable resistances as expressed on their respective indicators, means for continuously varying each variable resistance in accordance with the different positions capable of being assumed by its respective movable member, means sequentially connecting the variable resistances in the reading circuit and for thereafter connecting the fixed monitor resistance in the reading circuit, and means at said remote point and operating in phase with said connecting means for sequentially connecting the first mentioned resistance indicators in the reading circuit to render indications of their respective resistances, and for thereafter connecting said separate resistance indicator in the circuit to render an indication of said fixed monitor resistance as modified by resistance conditions in the reading circuit to permit corrective reading of said other indicators.

2. In an apparatus for indicating at a remote point the relative positions of a series of movable members, a variable resistance for each movable member, a fixed monitor resistance, a reading circuit including a resistance indicator for each movable member having a definite resistance-reading range commensurate with the resistance value of its respective movable member and a separate resistance indicator for the fixed monitor resistance having a reading range commensurate with the value of the fixed monitor resistance, said fixed monitor resistance having a resistance value lying outside of the operating range of the variable resistances as expressed on their respective indicators, means for continuously varying each variable resistance in accordance with the different positions capable of being assumed by its respective movable member, means sequentially connecting the variable resistances in the reading circuit and for thereafter connecting the fixed monitor resistance in the reading circuit, means at said remote point operating in phase with said connecting means for sequentially connecting the first mentioned resistance indicators in the reading circuit to render indications of their respective resistances and for thereafter connecting said separate resistance indicator in the circuit to render an indication of said fixed monitor resistance, and holding means operable upon connecting each indicator in the circuit for maintaining its respective indication until all of the indicators have been connected in the circuit.

WARD LEATHERS.